US008554768B2

(12) United States Patent
Venolia

(10) Patent No.: US 8,554,768 B2
(45) Date of Patent: Oct. 8, 2013

(54) AUTOMATICALLY SHOWING ADDITIONAL RELEVANT SEARCH RESULTS BASED ON USER FEEDBACK

(75) Inventor: Gina D Venolia, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 12/323,319

(22) Filed: Nov. 25, 2008

(65) Prior Publication Data

US 2010/0131494 A1     May 27, 2010

(51) Int. Cl.
*G06F 17/30*     (2006.01)
*G06F 3/048*     (2013.01)

(52) U.S. Cl.
USPC ............................ 707/733; 707/748; 715/811

(58) Field of Classification Search
USPC ................. 707/732–733, 734, 766, 736, 748; 715/810, 811
See application file for complete search history.

(56) References Cited

U.S. PATENT DOCUMENTS

| | | | | |
|---|---|---|---|---|
| 7,716,236 | B2 * | 5/2010 | Sidhu et al. ................... | 707/766 |
| 7,801,885 | B1 * | 9/2010 | Verma ........................... | 707/713 |
| 7,831,928 | B1 * | 11/2010 | Rose et al. ..................... | 715/810 |
| 2002/0087526 | A1 * | 7/2002 | Rao .................................. | 707/3 |
| 2006/0004702 | A1 | 1/2006 | St. John et al. | |
| 2006/0106793 | A1 * | 5/2006 | Liang .............................. | 707/5 |
| 2006/0116994 | A1 | 6/2006 | Jonker et al. | |
| 2006/0242553 | A1 * | 10/2006 | Kulas ........................ | 715/501.1 |
| 2007/0156783 | A1 | 7/2007 | Zbogar-Smith et al. | |
| 2007/0198578 | A1 | 8/2007 | Lundberg et al. | |
| 2008/0005075 | A1 | 1/2008 | Horvitz et al. | |
| 2008/0141221 | A1 | 6/2008 | Benesovska et al. | |
| 2009/0319512 | A1 * | 12/2009 | Baker et al. ....................... | 707/5 |
| 2010/0110099 | A1 * | 5/2010 | Averett et al. ................. | 345/592 |

OTHER PUBLICATIONS

Meredith Ringel Morris & Eric Horvitz, "SearchTogether: An Interface for Collaborative Web Search", Proceedings of the ACM's UIST, Oct. 7-10, 2007, pp. 1-10.*
T.M. Mann, "Visualization of WWW-search Results", IEEE Proceedings of 10th International Workshop on Database and Expert Systems Applications, 1999, pp. 264-268.*
Susan Dumais et al., "Stuff I've Seen: A System for Personal Information Retrieval and Re-Use", ACM SIGIR '03, Jul. 28-Aug. 1, 2003, pp. 72-79.*
Dagstuhl Seminar 07491 Homepage, "Mining Programs and Processes", Seminar held Dec. 2-7, 2007, available at www.dagstuhl.de/en/program/calendar/semhp/?semnr=07491.*
Gina Venolia, "Backstory: A Search Tool for Software Developers Supporting Scalable Sensemaking", (2007), pp. 1-5.*

(Continued)

*Primary Examiner* — Rehana Perveen
*Assistant Examiner* — Scott A Waldron
(74) *Attorney, Agent, or Firm* — Lee & Hayes, PLLC

(57) ABSTRACT

This disclosure describes various exemplary application user interfaces, methods, and computer program products for information retrieval or search technology by automatically showing additional relevant search results based on user feedback. The search describes receiving a submitted query from a user, identifying multiple query search results in a relationship to the submitted query, and presenting the multiple query search results in a single structured presentation with a thumbs-up icon, a thumbs-down icon, or an unmarked status to enhance the user experience. Furthermore, the search results illustrate the relationships between each of the multiple query search results and the submitted query in a textual description.

20 Claims, 5 Drawing Sheets

(56) References Cited

OTHER PUBLICATIONS

Gina Venolia, "Backstory: A Search Tool for Software Developers Supporting Scalable Sensemaking", Microsoft Research Technical Report MSR-TR-2008-13, Jan. 2008, pp. 1-6.*

Bae, et al, "Patterns of Reading and Organizing Information in Document Triage", retrieved at <<http://www.csdl.tamu.edu/~marshall/asist-reading-triage.pdf>>, Microsoft Corporation, pp. 1-18.

Marshall, et al, "Spatial Hypertext and the Practice of Information Triage", retrieved at <<http://www.csdl.tamu.edu/~shipman/papers/ht97viki.pdf>>, Department of Computer Science, Texas A&M University, pp. 1-10.

Venolia, "Backstory". retrieved Sep. 1, 2008 at <<http://research.microsoft.com/hip/backstory/>>, Microsoft Research, pp. 1-2.

Venolia, et al, "Exploring and Investigating: Supporting High-Level Search Activities", retrieved at <<http://research.microsoft.com/~merrie/papers/persistent_search_wkshop_paper.pdf>>, Microsoft Research, 2007, pp. 1-7.

Jonker, et al, "Information Triage with TRIST", retrieved Sep. 1, 2008 at <<http://64.233.183.104/search?q=cache:g_uaHazgJQEJ:https://analysis.mitre.org/proceedings/Final_Papers_Files/22_Camera_Ready_Paper.pdf+%22search+results%22+triage+quality+feedback+more&hl=en&ct=clnk&cd=1>>, pp. 1-6.

* cited by examiner

AUTOMATICALLY SHOWING ADDITIONAL RELEVANT SEARCH RESULTS BASED ON USER FEEDBACK

TECHNICAL FIELD

The subject matter relates generally to search technology, and more specifically, to improving quality and quantity of search results by providing additional relevant search results.

BACKGROUND

Search technology generally provides a great deal of information to individuals who can connect to the Internet or search a database or a desktop with a computing device. For example, a keyword search can instantly return thousands of web pages or large result sets that may be relevant or not relevant to the search terms.

There is room for improvement in how to provide good search results and in how to best display the results, especially when the results are numerous. The problem with search technology is managing the large result sets in the user interface with the number of search results shown per page and providing controls to navigate among these search result pages. The typical page display of search results disproportionately penalizes search results that are not shown on the first page. Another problem with search technology is showing a continuous scrolling list of all of the search results. This scrolling display makes it impractical to manage and to scroll through the large search result sets. Thus, the huge amount of information is too numerous for individuals to navigate through the large search result sets.

Various techniques are desired to display the query search results, since the practical display capability of a computer monitor is limited. In particular, a display of lengthy query search results may not be organized or organized well. Furthermore, the manner of presentations of query search results may affect the search tasks, in not being very efficient or useful to the individuals.

Another problem with the large number of query search results is that potentially relevant results may not be displayed, reducing a chance of addressing the specific information requests of the user. Therefore, it is desirable to find ways to generate additional relevant search results and how to effectively display the results for the query search.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary application programming interfaces, methods, and computer program products, for information retrieval or search technology by automatically showing additional relevant search results based on user feedback. The search describes receiving a submitted query from a user, identifying multiple query search results in a relationship to the submitted query, and presenting the multiple query search results in a single structured presentation with a thumbs-up icon, a thumbs-down icon, or an unmarked status to enhance the user experience. Furthermore, the search results illustrate the relationships between each of the multiple query search results and the submitted query in a textual description. At least one or more additional relevant search results are displayed after a user clicks on the thumbs-up icon or the thumbs-down icon. Thus, this disclosure provides additional relevant query search results based on feedback of the user and removes or hides query search results that are not relevant based on response received from the user, such as clicks on the thumb icons.

BRIEF DESCRIPTION OF THE DRAWINGS

The Detailed Description is set forth with reference to the accompanying figures. The teachings are described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to various exemplary application programming user interfaces, methods, and computer program products for search technology by providing additional relevant query search results based on user response. The process performs simultaneous search across multiple data sources and workflow support for multi-query investigations. Investigations refer to a group of related queries to retrieve relevant information. Thus, the disclosure includes several mechanisms for supporting the investigations.

The different mechanisms include: triaging the results, adding tags, working with a browser, pivoting, and saving a file. Triaging occurs when the user determines whether the query search result are relevant or not relevant based on a subjective indication. For example, the user clicks on the thumbs-up icon indicating the search result is relevant and/or the thumbs-down icon indicating the query search result is not relevant. Other mechanisms include adding tags to create categories meaningful for tasks, viewing a result in the web browser, searching for related items by right clicking, and saving the item to a file.

In another aspect, the process describes receiving entry of a submitted query by a user and identifying each of multiple query search results in a relationship to the submitted query. The user interface displays the multiple query search results in a single structured presentation with a thumbs-up button, a thumbs-down button, or an unmarked status. Next, the process describes the relationships between the submitted query and each of the multiple query search results in a textual description. The user interface displays at least one or more additional relevant search results after the user clicks on the thumbs-up icon or the thumbs-down icon, as long as the feature is enabled. Thus, this disclosure provides additional relevant query search results while removing or hiding from view the query search results that are not relevant. A benefit to the user is that the additional relevant query search results are based on receiving input from the user.

The described process for providing additional relevant query search results during information retrieval, improves efficiency and convenience for the user. Furthermore, the process for providing additional relevant query search results described minimizes irrelevancy among the query search results. By way of example and not limitation, the additional relevant query search results method described herein may be applied to many contexts and environments. The process for providing additional relevant query search results may be implemented to support information retrieval for documents or web searching, on enterprise networks, with databases, on content websites, on content blogs, with various types of services, using search engines, and the like.

Illustrative Environment

Figure 1:
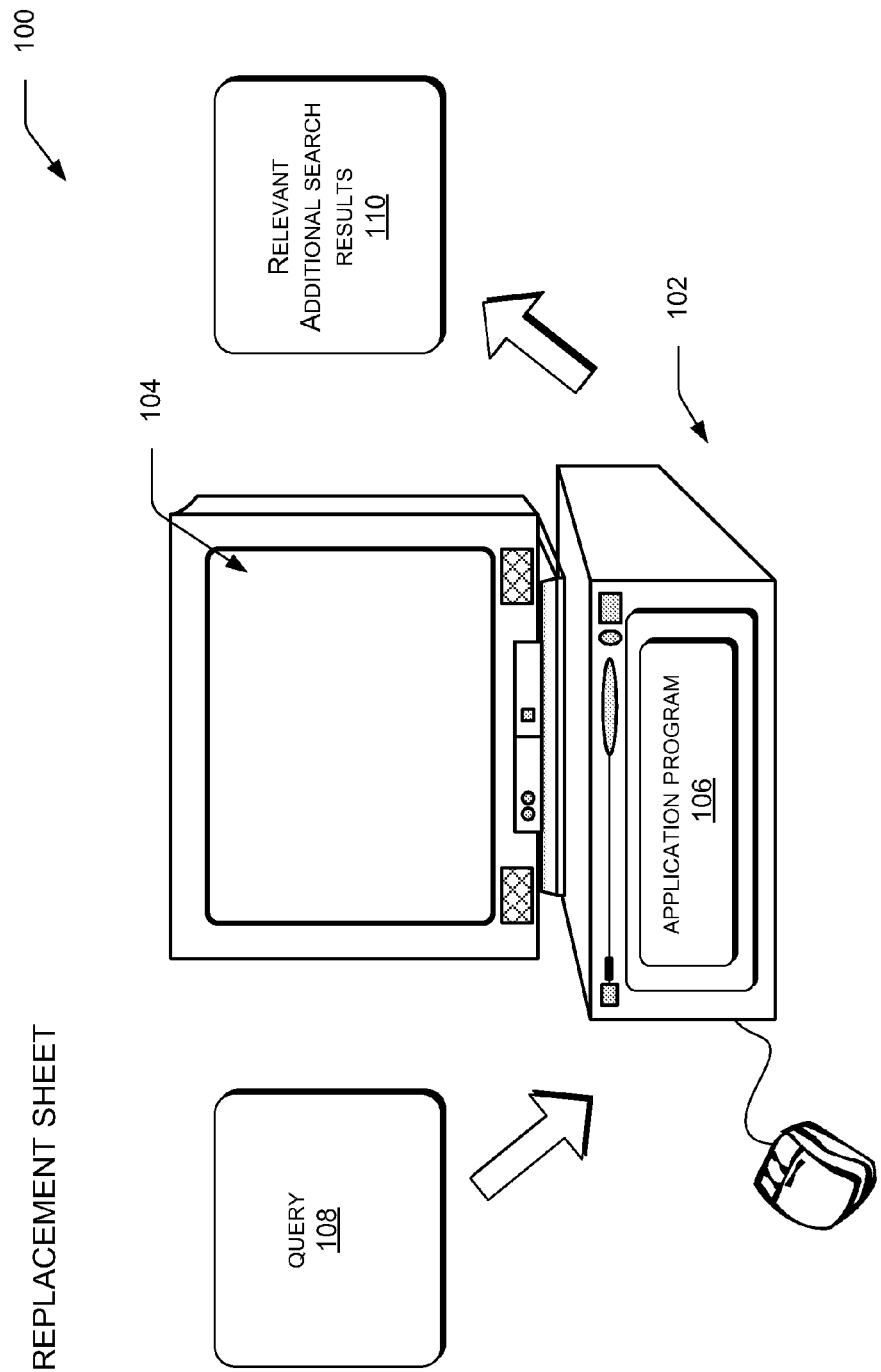
FIG. 1 is a block diagram of an exemplary system for improving the quality and user experience of search technology by providing additional relevant search results.

FIG. 1 is an overview block diagram of an exemplary system 100 for improving the quality and user experience of search technology by providing additional relevant query search results based on user input. Shown is a computing device 102 for implementing a search. Computing devices 102 that are suitable for use with the system 100, include, but are not limited to, a personal computer, a laptop computer, a desktop computer, a workstation computer, a personal digital assistance, a cellular phone, a smart phone, any other mobile or stationary computing device, and the like. The computing devices 102 may be connected to one or more stored databases and various user terminals via a network, such as the internet.

The computing device 102 may include a monitor 104 to display the query search results for information retrieval. The monitor 104 displays a single structured presentation of the query search results and the additional relevant query search results.

The system 100 may provide the additional relevant query search results as, for example, but not limited to, a tool, a method, a solver, software, an application program, a service, technology resources which include access to the internet, and the like. Here, providing additional relevant query search results is implemented as an application program 106, referred to as additional relevant query search results application program 106. For convenience, the term, additional relevant query search results application program, will be used interchangeably with the terms additional query search results application program, application program, and showing more results.

Implementation of the additional relevant query search results application program 106 includes receiving entry of a submitted query by the user 108. The initial query search may be accomplished using any of various well known searching techniques. Next, the application program 106 identifies a relationship between the submitted query and each of the multiple query search results.

Figure 4:
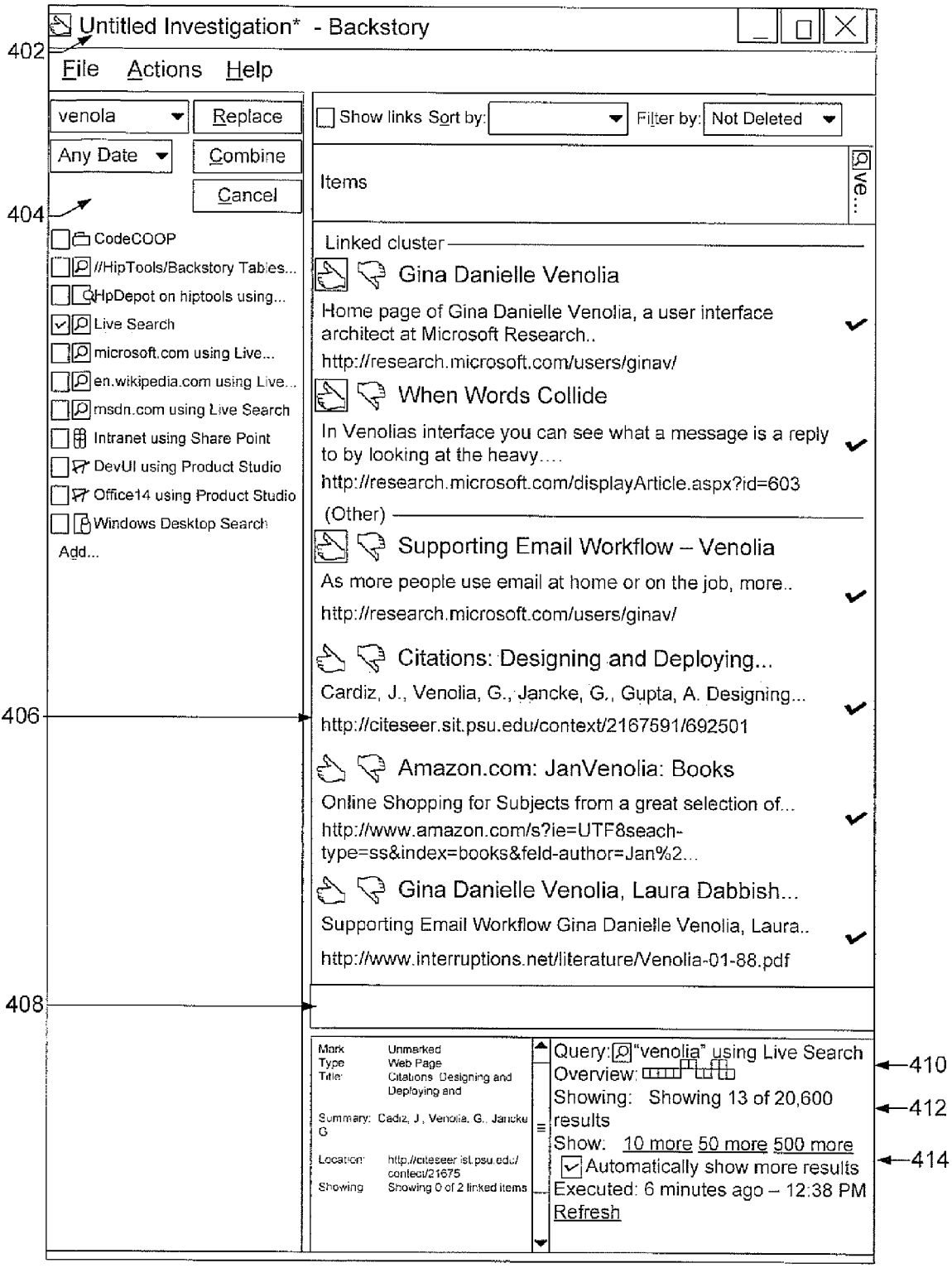
FIG. 4 is a schematic diagram showing an exemplary user interface for entering a query in the search and displaying a structured presentation of the query search results of FIG. 1.

A sparkline, a type of information graphics is used to illustrate the quality of the multiple query search results. For example, the sparkline displays trends and variations associated with the query search results, which is shown as a series of flags. An example of the sparkline is shown in FIG. 4.

The application program 106 presents the multiple query search results in a single structured presentation with a thumbs-up button, a thumbs-down button, or an unmarked status. The listing of each search result item allows the user to indicate if the query search results are subjectively relevant to the user's search query. For example, an indication of subjective relevance is provided by selecting a thumbs-up button as relevant and a thumbs-down button as not relevant.

The application program 106 helps improve information retrieval for a query search by further expanding the query search results available to the user. In particular, additional query search results are automatically shown based on subjective feedback from the user, as long as the feature is enabled. In some implementations, the feature is available to disable the function of automatically showing more research results. The application program 106 includes a checkbox feature for disabling the at least one or more additional search results function for a multiple search environment. If the checkbox is not marked, the application program 106 will not show additional search results, after the user indicates a preference on the thumbs-up button and/or the thumbs-down button. The users may prefer to not indicate subjective relevance and not have to sift through additional search results.

The items in the query search results are ordered based on an occurrence of the multiple queries during the search. The items listed in the top ten order are items most often found during the query search. A title of each query search results is shown along with a textual description describing the relationships of each of the query search results relative to the submitted query term. The title of an item is shown in bold and large font, initially. Once the item has been read, viewed, or scanned, the title of the item is no longer shown in bold font but becomes small font.

When the user clicks on the thumbs-up button, the application program 106 will show additional relevant query search results 110 as long as the feature is enabled. When the user clicks on the thumbs-down button, the application program 106 will either delete the item in the query search results or hide the item from view but not delete the item, as this item is considered to be not relevant by the user. Then the application program 106 shows additional relevant query search results 110 as long as the feature is enabled. As a result of providing additional relevant search results, there are at least one or more unmarked search results visible to the user. In an implementation, when the user clicks on the thumbs-up or thumbs-down button, the application program will reveal three subsequent search results that are unmarked and visible to the user.

Illustrative Process

Figure 2:
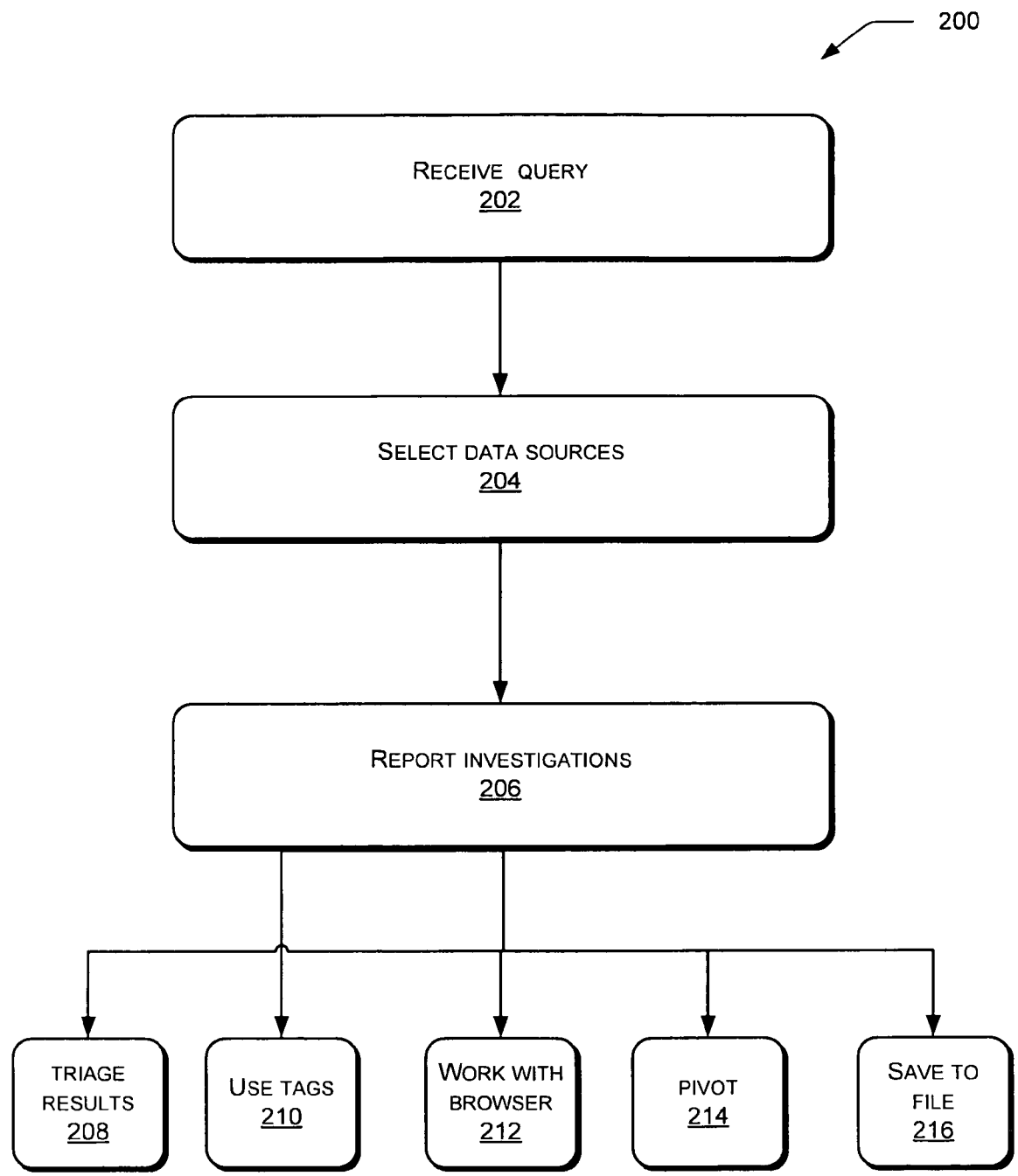
FIG. 2 is an overview flowchart showing an exemplary process for implementing the search of FIG. 1.

Illustrated in FIG. 2 is an overview exemplary flowchart of a process 200 for implementing the additional relevant query search application program 106. The application program 106 provides a benefit to users by finding additional relevant query results based on user input. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

The flowchart for the process 200 provides an example of the application program 106 of FIG. 1. The process performs simultaneous search across multiple data sources and workflow support for multi-query investigations. Starting at block 202 is receiving a query submitted from a user. The query and keywords are terms to indicate an entry submitted by the user in order to perform a search or information retrieval. In certain implementations, there are functions in the application program 106 that allows the user to indicate a date for the search, to combine the search and the like. For example, the query search may be conducted for a specific timeline.

At block 204, the process allows users to select data sources for the search tasks. For example, there may be multiple checkboxes shown including but not limited to, a list of search engines, services, databases, check-in history, source code, local files, email, and the like for the application program 106 to search to locate relevant query results. The application program 106 has checkboxes for the user to mark which data sources to include in the search and offers options to add more search providers. The search providers that may be added include, but are not limited to, Code COOP and the kind, Indexing Service, Live Search, Product Studio, SharePoint, Team Foundation Server, Text File Lines, Windows Desktop Search and the like.

At block 206, the application program 106 reports investigations for the query search results. Investigations occur when the search activities require multiple queries to retrieve relevant information. Thus, the related queries are commonly referred to as investigations. The application program 106 supports different mechanisms for investigations. A discussion of the various mechanisms supporting investigations follow.

Block 208 illustrates triage query search results in the application program 106. Triage is a process of finding documents that may be relevant to a topic or a search, discarding irrelevant documents or search results, and retaining the relevant documents or search results. As part of the triage, the search results are marked as relevant to the investigation if the user clicks on the thumbs-up button. The user may use the filter drop-down to view the relevant results. In particular, based on response of the thumbs-up button or the thumbs-down button, the application program 106 provides additional relevant search results. Furthermore, although the top ten results are shown by default, the user may right-click on a query's column header to choose Get More Results.

For example, the application program 106 discards irrelevant search results from the search query set when the user clicks on the thumbs-down button. In another implementation, the application program hides the irrelevant search results from view, but the results are not deleted. If a later search finds the same search result, and the search result was discarded, the search result remains discarded. However, the user may view the discarded search result item using a filter drop-down.

Shown in block 210 is using tags. In particular, the application program 106 may include a column of checkboxes that enables the user to categorize and to mark an item in the multiple query search results. By marking the item(s) in the query search results, this helps the user with workflow management or to create categories meaningful to a task.

Block 212 indicates how the thumbs-up or thumbs-down icons may be integrated into the toolbar of the browser, such as Internet Explorer. This integration allows the user to view an item in the multiple query search results in a separate browser without interrupting a search context.

In block 214, pivot occurs. For example, some query search results allow the user to search for related items. When the user right clicks on a search result that is a web page, and then chooses Search for Pages That Link To This One, a new query is created that adds the related web pages to the investigation.

Shown in block 216, is saving to file, which is another benefit for the user with the application program 106. In this implementation, the user may save the investigation to a file. The saved file enables the user to open the items in the file for later use, move the file to another computing device, or share the file with another user.

Figure 3:
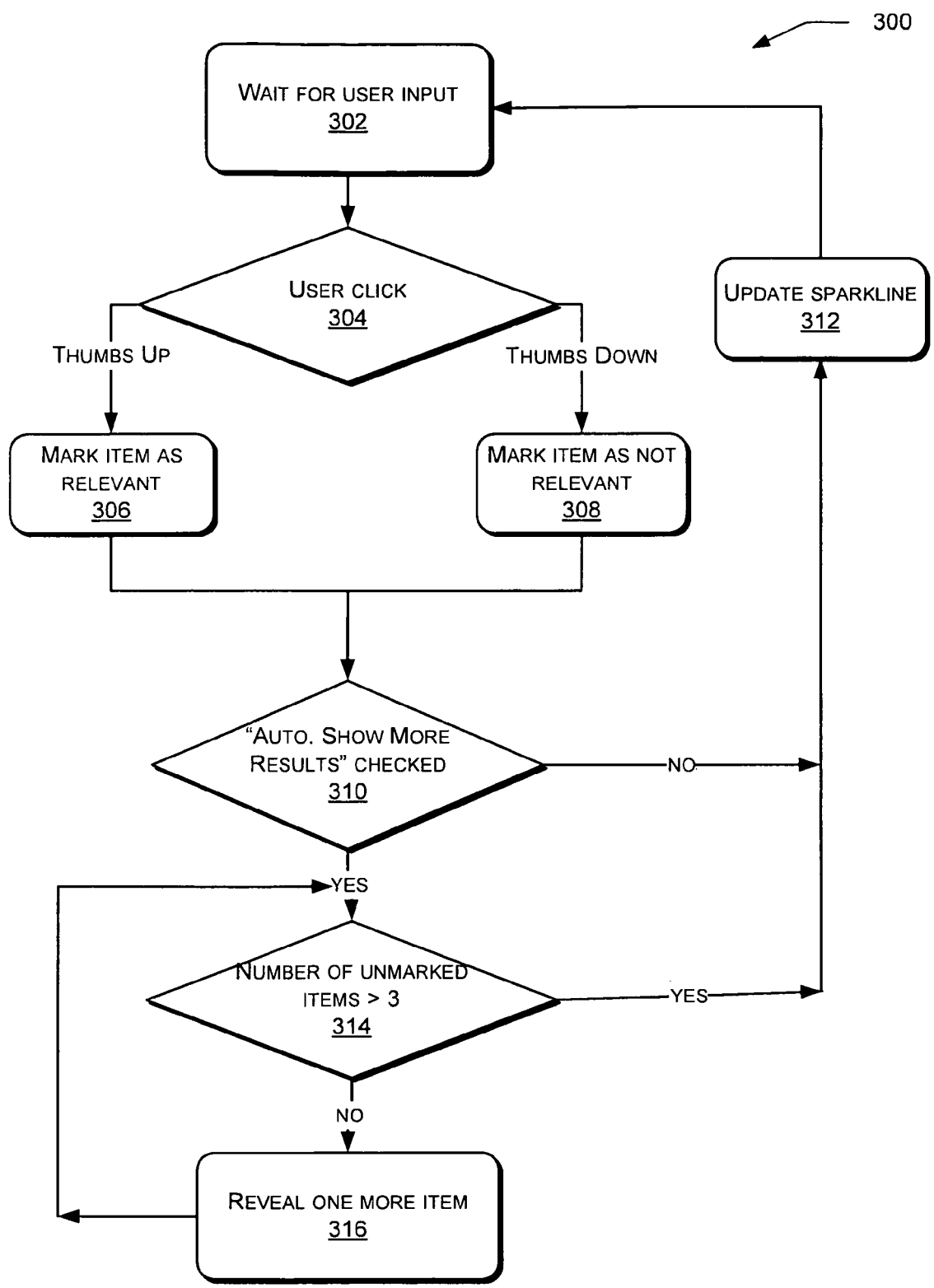
FIG. 3 is a block diagram of an exemplary process for showing the query search results with a sparkline.

FIG. 3 is a block diagram of an exemplary process flow 300 for showing query search results to the user associated with the additional relevant application program 106. Block 302 represents waiting for the user to provide input after receiving search results for the queries. The action in block 302 occurs after the user had submitted a query or a keyword for a search. The process may use algorithms to identify each of multiple query search results in a relationship to a submitted query.

Block 304 represents the user deciding which of the different thumb icons to click on, based on the subjective indication of the user. The user will evaluate whether the item in the query search results is relevant or not relevant to the query submitted. For example, if the user clicks on the Thumbs-Up button (shown along the left side), this indicates the query search result item is relevant. The user clicking on the Thumb-Up button, will mark the item as relevant to the submitted query as represented by block 306.

Returning to block 304, the user may click on the Thumbs-Down icon, following the process along the right side of block 304. For example, the user may click on the Thumbs-Down button, indicating the query search result item is not relevant. The user clicks on the Thumb-Down button will mark the item as not relevant to the submitted query as represented by block 308.

Once the user has clicked on the thumbs icon and the items are marked as relevant or not relevant, the process flow moves to a decision block 310, representing "Automatically Show More Results". In this implementation, there is a box to be checked for "Automatically Show More Results". If the box is unchecked, this indicates the functionality is not turned on, indicating a NO for "Automatically Show More Results" block 310, shown along the right side of the decision block 310.

When the feature is not turned on, the process 300 moves to the right side and travels up along the line to Update Sparkline, as represented by block 312. As mentioned, Sparkline provides feedback per search about the quality of the query search results. Sparkline shows feedback for the thumbs-up icon, the thumbs-down icon, the unmarked or unread status of each item in the query search results. The results of the query search may be displayed and categorized in a top ten results based on an occurrence among the multiple queries. Thus, Update Sparkline 312 provides updated information about the quality of the search results. The process then continues to block 302 waiting for user input. Blocks 310 and 312 may be repeated at any suitable interval to update Sparkline to provide the latest feedback on the quality of the search results, once the user unchecks "Automatically Show More Results". The process maintains a minimum number of visible, unmarked search results.

Returning to decision block 310, if the "Automatically Show More Results" block is checked, the process flow will follow the YES line to decision block 314. When the feature is enabled, additional query search results are displayed to the user.

Initially, the query search results are grouped as triaged or untriaged. In one implementation, the item is marked as triaged when the user selects the item for viewing. Untriaged is a default position for the item(s) in the query search results. The item remains as untriaged until the user clicks on the thumbs-up button or the thumbs-down button. One of the advances with the application program 106 is to keep a minimum number of untriaged results.

If the investigation changes in any significant way, for each search with the additional relevant query search results feature turned on (not disabled), the application program 106 counts the number of untriaged, visible items as represented by block 314. The process flow may respond with YES when the number of unmarked items are greater than three. From block 314, the process flow travels along the right side to Update Sparkline 312. Blocks 314 and 312 may be repeated at any suitable interval to update Sparkline to provide the latest feedback on the quality of the search results, if the number of unmarked items are greater than three.

In an implementation, if the number of untriaged, visible items is less than a certain threshold, the process may increase the number of visible items for the search based on the difference. There are several ways to determine the certain threshold: may be predetermined, determined by the user at the time of entering the query, or determined by the user at the time of receiving the query results, and the like. In an implementation, the application program 106 has about a minimum number of three untriage results. The minimum number of untriaged results may range from at least one to about five untriage results.

Returning to block 314, if the number of unmarked items is less than three, the process flow will take a NO branch to reveal one more item, as represented by block 316. From there, the process flow 300 may continue to block 314, representing the number of unmarked items which are greater than 3. Blocks 316 and 314 may be repeated at any suitable interval to determine the number of unmarked items and reveal one more item for the search query. While specific examples of query results order are described herein, it should be understood that any other known order and search techniques could additionally or alternatively be used.

Exemplary User Interface

FIG. 4 illustrates a schematic diagram of an exemplary user interface 400 for the application program 106 of FIG. 2. FIG. 4 is a schematic diagram showing the query search results in a single structured presentation for the application program 106 of FIG. 2.

Shown at 402 is an entry block for receiving a query submitted from a user with an option for dates selected. The query and keywords are terms to indicate the entry submitted by the user in order to perform the search or information retrieval. The user interface 400 allows the user to indicate a date for the search, to combine the search and the like. For example, the query search may be conducted for a specific timeline.

At 404 are the different data sources the user may select for the search. For example, there may be multiple checkboxes for data sources shown including but not limited to, a list of search engines, services, databases, check-in history, source code, local files, email, and the like for the application program 106 to search to locate relevant query results. The application program 106 has checkboxes for the user to mark which data sources to include in the search and offers options to add more search providers. The search providers that may be added include, but are not limited to, Code COOP and the kind, Indexing Service, Live Search, Product Studio, SharePoint, Team Foundation Server, Text File Lines, Windows Desktop Search and the like.

Shown at 406 are the thumbs-up icon, thumbs-down icon that the user would click to indicate whether the item is relevant or not relevant to the submitted query. The title of each query search results is shown along with a textual description describing the relationships of each of the query search results relative to the submitted query term. The title of an item is shown in bold and large font, initially. Once the item has been read, viewed, or scanned, the title of the item is no longer shown in bold font but becomes small font.

At 408 is an item that is unmarked. For the unmarked item, these items are shown for each item: the type of data, the title of the item, a summary of the item, a location for the item, and showing of linked items.

At 410 is Query information about the query. In this example, the query is for "venolia" using Live Search.

At 412 is the Overview display which shows the sparkline, a type of information graphics used to illustrate the quality of the multiple query search results. For example, the sparkline displays trends and variations associated with the query search results, which is shown as a series of flags.

The user interface illustrates a field entitled "Showing" indicating that 13 results out of 20,600 results are shown. Also shown is a field entitled "Show" where the user may select to show 10 more, 50 more, or 500 more query search results.

Block 414 illustrates the "Automatically show more results" checkbox. This feature is for providing additional relevant query search terms. The benefit to the user is the feature may be easily turned on by checking the box or turned off by unchecking the box. When the user clicks on the thumbs-up button, the application program 106 will show additional relevant query search results. When the user clicks on the thumbs-down button, the application program 106 will either delete the item in the query search results or hide the item from view but not delete the item, as this item is considered to be not relevant by the user. If the feature is checked, the application program 106 shows additional relevant query search results in response to the thumbs-icon response.

Exemplary Computing System

Figure 5:
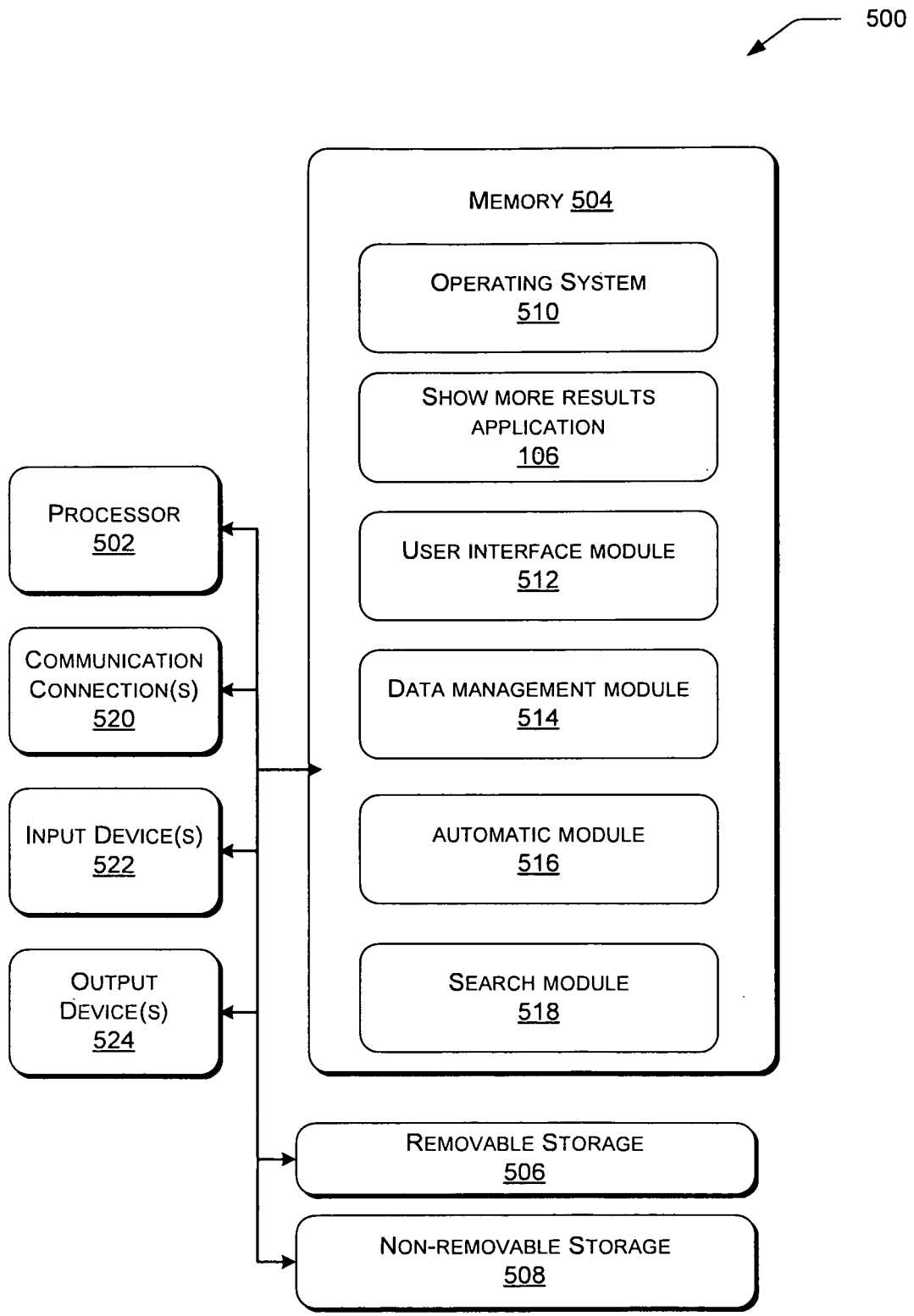
FIG. 5 is a block diagram showing an exemplary computing device for providing additional relevant search results.

FIG. 5 is a schematic block diagram of an exemplary general operating system 500. The system 500 may be configured as any suitable system capable of implementing the additional relevant query search application program 106. In one exemplary configuration, the system comprises at least one processor 502 and memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The system may also include additional removable storage 506 and/or non-removable storage 508 including, but not limited to, magnetic storage, optical disks, and/or tape storage. The disk drives and their associated computer-readable medium may provide non-volatile storage of computer readable instructions, data structures, program modules, and other data for the communication devices.

Turning to the contents of the memory 504 in more detail, may include an operating system 510, one or more additional query search application program 106 for implementing all or a part of the additional relevant query search method. For example, the system 500 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 504 includes the additional relevant query search application program 106 including a user interface module 512, a data management module 514, an automatic module 516, and a search module 518. The user interface 512 displays to the user a graphical user interface for the query-based search, including an interface prompting the user to enter a keyword or a query. The user interface also displays the query search results to the user. The data management module 514 stores and manages storage of information, and the like, and may communicate with one or more local and/or remote databases or services. The automatic module 516 allows the process to operate without human intervention, such as automatically showing more relevant query search results once the user provides feedback by clicking on the thumbs icons. The search module 518 interacts with the user interface module 512 to perform search functions, such as performing textual searches using conventional text search methodologies.

Memory 504, removable storage 506, and non-removable storage 508 are all examples of computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 500 may also contain communications connection(s) 520 that allow processor 502 to communicate with servers, the user terminals, and/or other devices on a network. Communications connection(s) 520 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 500 may also include input device(s) 522 such as a keyboard, mouse, pen, voice input device, touch input device, etc., and output device(s) 524, such as a display, speakers, printer, etc. The system 500 may include a database hosted on the processor 502. All these devices are well known in the art and need not be discussed at length here.

The subject matter described above can be implemented in hardware, or software, or in both hardware and software. Although embodiments of click-through log mining for ads have been described in language specific to structural features and/or methodological acts, it is to be understood that the subject matter defined in the appended claims is not necessarily limited to the specific features or acts described above. Rather, the specific features and acts are disclosed as exemplary forms of exemplary implementations of click-through log mining for ads. For example, the methodological acts need not be performed in the order or combinations described herein, and may be performed in any combination of one or more acts.

The invention claimed is:

1. A system comprising one or more computer-readable devices maintaining computer-readable instructions that, when executed by a processor, cause the processor to perform acts comprising:
   providing options to select from data sources for conducting a search for a submitted query, the options to specify a number of query search results to be displayed on a display device;
   utilizing algorithms to identify a plurality of query search results based at least in part on the query;
   presenting each of the plurality of query search results with an associated first icon and an associated second icon along with a respective textual description, the first icons being selectable by the user to indicate a corresponding query search result is relevant to the query, the second icons being selectable by the user to indicate a corresponding query search result is not relevant to the query;
   displaying at least one additional search result in response to detecting a selection of one of the first icons associated with one of the plurality of query search results, the at least one additional search result being relevant to the query and determined based at least in part on a query search result associated with the selected first icon, the at least one additional search result being displayed with the plurality of presented query search results,
   wherein at least one of the at least one additional search results is untriaged by default, until the user selects the first icon or the second icon associated with the additional query search result;
   in response to detecting a selection of a second icon associated with a query search result, hiding the query search result associated with the selected second icon;
   disabling a feature associated with showing additional search results in response to detecting a selection of one of the first icons;
   displaying subsequent additional search results so that at least a minimum number of untriaged search results are visible; and
   displaying a series of flags to illustrate a quality of the plurality of query search results with trends and variations.

2. The system of claim 1, wherein the acts further comprise displaying a query column header that shows more query search results when the query column header is selected by the user.

3. The system of claim 1, wherein the acts further comprise displaying and categorizing a top ten query search results displayed at a top of the plurality of query search results based on an occurrence among multiple queries.

4. The system of claim 1, wherein the acts further comprise displaying a browser toolbar integrated with the plurality of query search results, the browser toolbar enabling the user to view one of the plurality of query search results in a separate browser without interrupting a search context.

5. The system of claim 1, wherein the acts further comprise enabling the user to save one of the plurality of query search results into a file, enabling the user to open the one of the plurality of query search results in the file for later use, enabling the user to move the file to another computing device, or enabling the user to share the file with another user.

6. The system of claim 1, wherein displaying the multiple query search results comprises:
   displaying a title for one of the plurality of the query search results in a bold font and a large font when the one of the plurality of query search results has not been previously selected; and
   displaying the title for the one of the plurality of query search results in the multiple query search results in a small font when the one of the plurality of query search results has been previously selected.

7. The system of claim 1, wherein the acts further comprise an option to indicate a specific timeline for the query being submitted, the option being received through one or more fields of the user interface that are separate from a field that receives entry of the query.

8. The system of claim 1, wherein the first icon comprises a thumbs-up icon, and the second icon comprises a thumbs-down icon.

9. The system of claim 1, wherein at least one of the untriaged search results includes at least one or more of a type of data, a title of the untriaged search result, a summary of the untriaged search result, a website of the untriaged search result, or an indication showing a number of linked items to the untriaged search result.

10. A method for displaying additional search results, implemented at least in part by a computing device, the method comprising:

provisioning options to select from data sources for conducting a search for a submitted query, the options to specify a number of query search results to be displayed on a display device;

utilizing algorithms to identify a plurality of query search results based at least in part on the query;

presenting each of the plurality of query search results with an associated first icon and an associated second icon along with a respective textual description, the first icons being selectable by the user to indicate a corresponding query search result is relevant to the query, the second icons being selectable by the user to indicate a corresponding query search result is not relevant to the query;

displaying at least one additional search result in response to detecting a selection of one of the first icons associated with one of the plurality of query search results, the at least one additional search result being relevant to the query and determined based at least in part on a query search result associated with the selected first icon, the at least one additional search result being displayed with the plurality of presented query search results, wherein at least one of the at least one additional search results is untriaged by default, until the user selects the first icon or the second icon associated with the additional query search result;

in response to detecting a selection of a second icon associated with a query search result, hiding the query search result associated with the selected second icon;

disabling a feature associated with showing additional search results in response to detecting a selection of one of the first icons;

displaying subsequent additional search results so that at least a minimum number of untriaged search results are visible; and displaying a series of flags to illustrate a quality of the plurality of query search results with trends and variations.

11. The method of claim 10, further comprising:

marking one of the at least one additional search result as triaged based on the selection of the one of the at least one additional search result for viewing, wherein the marking includes indicating that the one of the at least one additional search result is relevant to the submitted query when a first icon associated with the one of the at least one additional search result is selected by the user and, in response to the selection of the first icon associated with the one of the at least one additional search result, the relevant item remains displayed or indicating that the one of the at least one additional search result is not relevant to the submitted query when a second icon associated with the one of the at least one additional search result is selected by the user and in response to the selection of the second icon associated with the one of the at least one additional search result, the not relevant one of the at least one additional search result is hidden from view.

12. The method of claim 10, further comprising keeping a number of the at least one additional search result as untriaged results.

13. The method of claim 10, wherein the plurality of query search results are identified by utilizing resources that include at least one or more of search engines, databases, desktops, indexing services, internet based software services, SharePoint services, news books, or open directories.

14. The method of claim 10, wherein the acts further comprise an option to indicate a specific timeline for the query being submitted, the option being received through one or more fields of the user interface that are separate from a field that receives entry of the query.

15. The method of claim 10, wherein the first icon comprises a thumbs-up icon, and the second icon comprises a thumbs-down icon.

16. The method of claim 10, wherein at least one of the untriaged search results includes at least one or more of a type of data, a title of the untriaged search result, a summary of the untriaged search result, a website of the untriaged search result, or an indication showing a number of linked items to the untriaged search result.

17. A computer-readable storage device comprising computer-readable instructions executed on a computing device, the computer-readable instructions comprising instructions for:

providing options to select from data sources for conducting a search for a submitted query, the options to specify a number of query search results to be displayed on a display device;

utilizing algorithms to identify a plurality of query search results based at least in part on the query;

presenting each of the plurality of query search results with an associated first icon and an associated second icon along with a respective textual description, the first icons being selectable by the user to indicate a corresponding query search result is relevant to the query, the second icons being selectable by the user to indicate a corresponding query search result is not relevant to the query;

displaying at least one additional search result in response to detecting a selection of one of the first icons associated with one of the plurality of query search results, the at least one additional search result being relevant to the query and determined based at least in part on a query search result associated with the selected first icon, the at least one additional search result being displayed with the plurality of presented query search results, wherein at least one of the at least one additional search results is untriaged by default, until the user selects the first icon or the second icon associated with the additional query search result;

in response to detecting a selection of a second icon associated with a query search result, hiding the query search result associated with the selected second icon;

disabling a feature associated with showing additional search results in response to detecting a selection of one of the first icons;

displaying subsequent additional search results so that at least a minimum number of untriaged search results are visible; and displaying a series of flags to illustrate a quality of the plurality of query search results with trends and variations.

18. The computer-readable storage device of claim 17, further comprising instructions for displaying a series of flags to illustrate a quality of the at least one additional search result with trends and variations.

19. The computer-readable storage device of claim 17, wherein the acts further comprise an option to indicate a specific timeline for the query being submitted, the option being received through one or more fields of the user interface that are separate from a field that receives entry of the query.

20. The computer-readable storage device of claim 17, wherein the first icon comprises a thumbs-up icon, and the second icon comprises a thumbs-down icon.

* * * * *